UNITED STATES PATENT OFFICE.

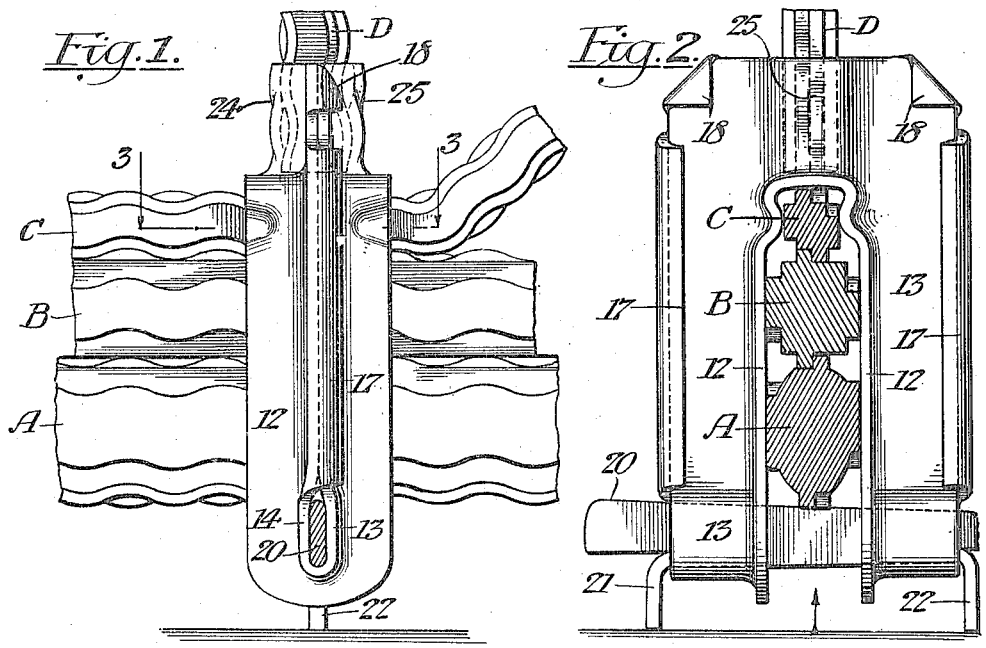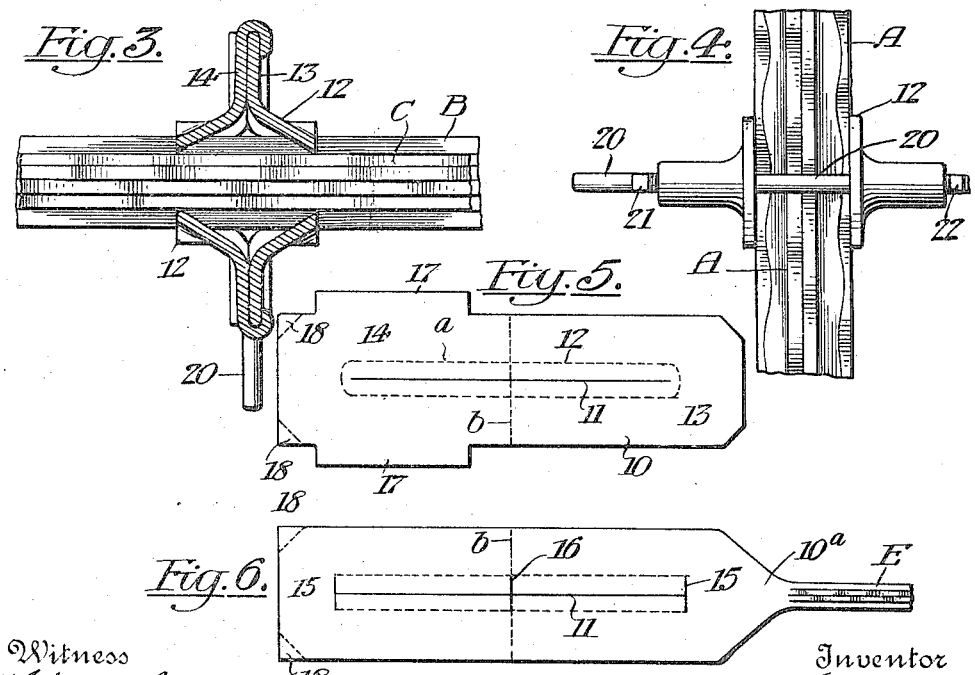

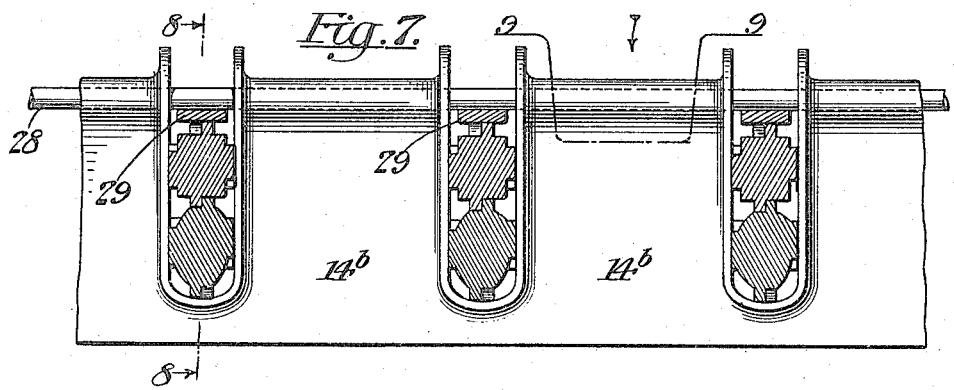
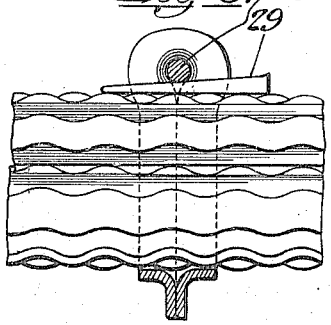
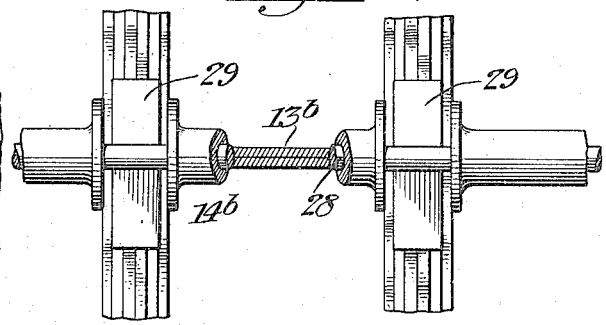
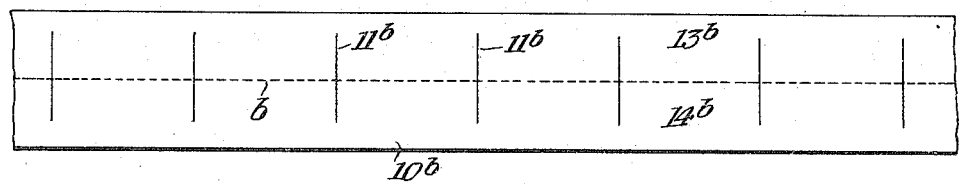
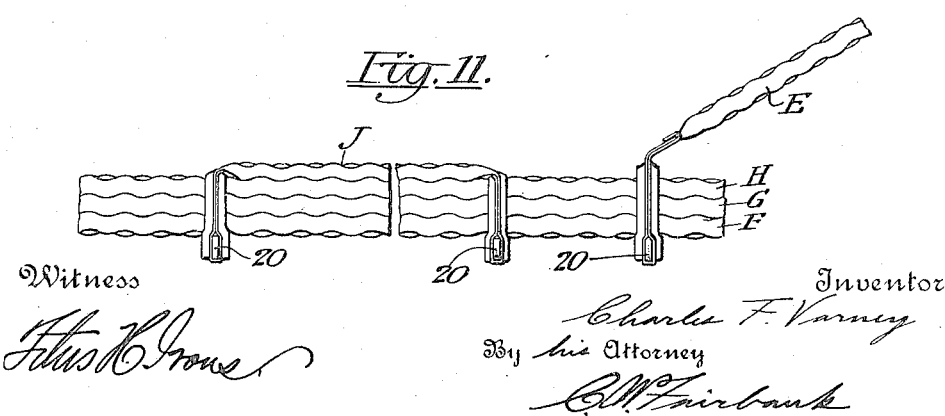

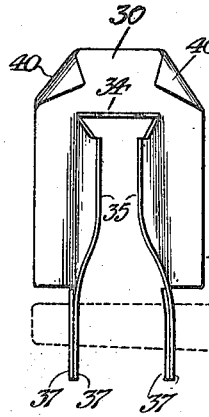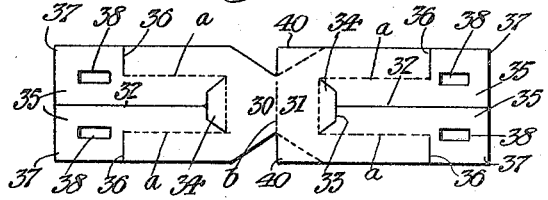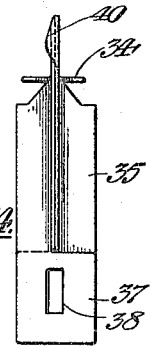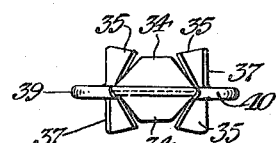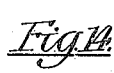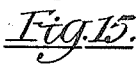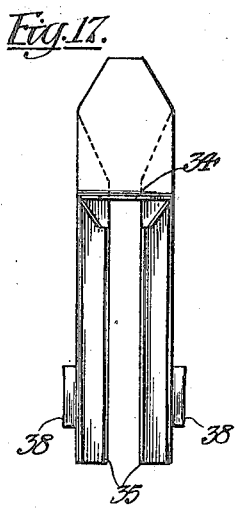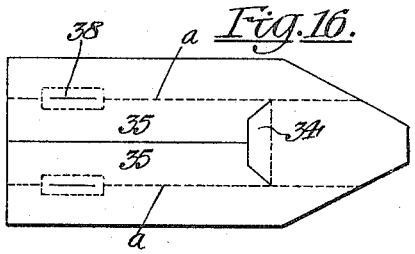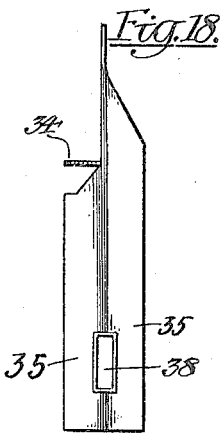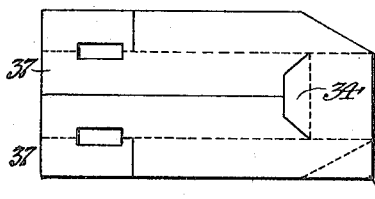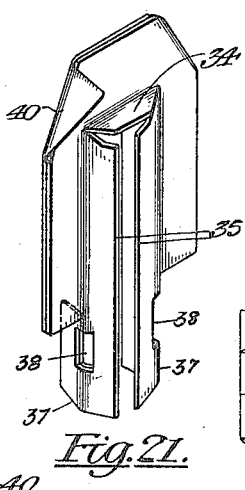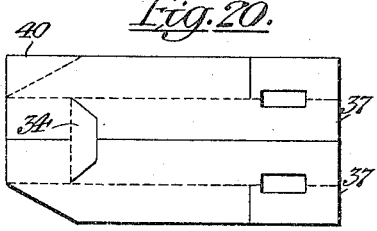

CHARLES F. VARNEY, OF NEWARK, NEW JERSEY, ASSIGNOR TO HIMSELF AND PETER IGOE, OF NEWARK, NEW JERSEY.

CLAMP FOR REINFORCING ELEMENTS.

1,202,336.

Specification of Letters Patent.

Patented Oct. 24, 1916.

Application filed July 23, 1915. Serial No. 41,465.

*To all whom it may concern:*

Be it known that I, CHARLES F. VARNEY, a citizen of the United States, and resident of Newark, in the county of Essex and State of New Jersey, have invented certain new and useful Improvements in Clamps for Reinforcing Elements, of which the following is a specification.

My invention involves certain improvements in clamps for securing together a plurality of bars and is particularly useful in connection with those types of bars, and in those relative arrangements and assemblies of bars, used as reinforcements for concrete or other similar composition.

More particularly, my invention relates to that type in which the bars are held in an open ended slot or aperture of the clamp by means of a separate rod, bar, wedge, or other retainer.

As an important feature of my invention, I so design the clamp that I can use one size and form of clamp for bars of various different widths and at the same time hold the bars against lateral movement without the use of auxiliary wedges or other separate members. This I accomplish by providing bendable portions which may be pressed toward or away from each other in accordance with the width of the bars to be held.

The clamp may be used merely for holding together superposed or overlapped tension or shear bars, or for connecting the end of a shear bar to one or more tension bars. It may serve to hold a shear bar at any desired angle in respect to a tension bar and may be formed independently of or rigid with, or integral with, a bar used either as a tension bar or as a shear bar. It may be formed either from a flat piece of sheet metal or from a piece of tubing, or from a flattened end portion of a bar. Although my improved construction is primarily designed for use in connection with concrete reinforcement, yet it may be employed in connection with other forms of structural steel elements used for other purposes than as concrete reinforcement.

Various different embodiments of my invention may be designed within the spirit of my invention and without departing from the scope of the appended claims, and therefore I desire the specific forms shown in the accompanying drawings to be considered in an illustrative sense rather than in a limiting one.

In these drawings, to which reference is to be had and in which similar reference characters indicate corresponding parts in the several views, Figure 1 is a side elevation of a plurality of bars connected together by one form of my improved clamp; Fig. 2 is an end view of the parts shown in Fig. 1, certain of the bars being shown in section; Fig. 3 is a transverse section on the line 3—3 of Fig. 1, the bars being shown in plan; Fig. 4 is an inverted plan view looking in the direction of the arrow in Fig. 2; Fig. 5 is a plan view of the blank from which the clamp in Figs. 1 to 4 inclusive, may be formed; Fig. 6 is a similar view of a blank constituting a flattened end portion of a bar; Fig. 7 is a view somewhat similar to Fig. 2, but showing a modified form of clamp designed for connecting spaced reinforcing units; Fig. 8 is a transverse section on the line 8—8 of Fig. 7; Fig. 9 is a top plan view of the structure shown in Fig. 7, a portion being broken away on the line 9—9 of Fig. 7; Fig. 10 is a plan view of a blank from which the clamp shown in Fig. 7 may be formed, said blank being shown on a very much reduced scale; Fig. 11 is a side elevation of a portion of a complete structure including certain forms of my improved clamp. Fig. 12 is a plan of a blank for a further form of clamp; Fig. 13 is a face view of a clamp made from the blank shown in Fig. 12; Fig. 14 is an edge view thereof; Fig. 15 is an end view thereof; Fig. 16 is a plan view of a blank for a further simplified form of clamp; Fig. 17 is a face view of a clamp formed from the blank shown in Fig. 16; Fig. 18 is an edge view thereof; Figs. 19 and 20 are plan views of separate blanks which may be used either separately or together; and Fig. 21 is a perspective view of a clamp made from the two blanks shown in Figs. 19 and 20.

The specific form of clamp shown in Figs. 1 to 4 inclusive, may be made from a sheet metal blank 10 of substantially the form shown in Fig. 5. This blank has a centrally disposed, longitudinally extending slot 11 from which the portions of the metal along opposite sides may bend back, and approximately on the dotted line $a$, to form flanges 12 at an angle to the plane of the blank. The blank is then folded or bent along the dotted line $b$ until the two plate portions 13 and 14 lie approximately parallel and closely adjacent to each other. The direction in which the plate is folded along the dotted line $b$ is such as will leave the flanges 12 of each plate portion projecting outwardly from the other plate portion.

In bending the metal outwardly to form the flange portions 12, it may be stretched or drawn at the ends of the slot 11 or there may be provided transverse slots 15, 15, at the ends of the slot 11 as shown in Fig. 6. In folding the plate along the dotted line $b$, the metal constituting the flanges 12 adjacent to said dotted line, may be drawn or stretched so as to leave the flanges of the plate portion 13 integral with those of the plate portion 14, or an additional transverse slot 16 may be cut on the folding line $b$ as shown in Fig. 6 so as to avoid any stretching or drawing of the metal.

In some constructions, the superposed plate portions need not be secured together after the folding operation and their free ends may be forced apart to effect the clamping action as will be hereinafter more particularly pointed out, but preferably the two plate portions are secured together by bending a portion of one around the edge of the other. As shown in Fig. 5, the plate portion 14 is provided with side extensions 17 which may fold around the edges of the plate portion 13 as shown particularly in Figs. 1, 2 and 3. The corners of the plate portion 13 are also shown as being cut away so that the corners 18 of the plate portion 14 may be bent over into engagement with the outer surface of the plate portion 13 as shown in Figs. 1 and 2. Instead of bending over the separate corners 18, the plate 14 may be made a little longer than the plate 13 and the projecting end bent over to make a continuous end flange. In the form of blank shown in Fig. 6, I have omitted the side extensions 17 and rely entirely upon the corners 18 to effect the desired locking together of the plate portions. In some constructions, the locking side flanges 17 may be used alone and without the locking corner flanges 18, if desired.

It is of course evident that in Fig. 5, I have shown the blank on a smaller scale than the clamp made from this blank, as shown in Figs. 1 to 4, inclusive. The blanks may be made of various different sizes, dependent upon the size and number of bars to be held by the clamp, but should be of such length that the slot 11 may be of a length slightly more than twice the height of the superposed bars to be held together. They should be of such width that the flange portions 12 can be bent back along lines spaced apart slightly greater than the width or diameter of the bars to be held. Thus, when the flanges are formed and the plate is bent on the folding line $b$, the clamp will be of substantially U-shape with the space between the side branches of the U, sufficiently wide and sufficiently deep to receive the superposed reinforcing bars. These bars may be of any desired cross sectional form. In Figs. 1 to 4, inclusive, I have shown three different forms of bars, A, B, and C, presenting such surface irregularities that they will interlock and be held against relative longitudinal movement. Although this is important, it forms no portion of my present invention and any kind, shape or number of bars may be employed, which bars may be either plain or deformed in any desired manner.

With the bars in place between the side members of the clamp, I then lock them in place preferably by means of a wedge driven transversely of the bars and between the plate portions 13 and 14, adjacent to the folding line. In Figs. 1 to 4 inclusive, I have shown the clamp placed on the bars with its open end below the latter so that a wedge 20 may be driven in beneath the bars. It is of course evident that the clamp might be put on so as to face in the opposite direction and permit the wedge to be driven in above the bars.

One special advantage of placing the wedge below and one special advantage of the improved form of wedge shown is that it permits the use of the wedge as a support to hold the bars at the desired height above the bottom of the form in which the concrete is to be poured. The wedge 20 is illustrated as being formed of a flat strip slitted lengthwise for a short distance at its two ends. The slit at each end is preferably somewhat nearer to the lower edge of the wedge than to the upper edge so that after the wedge is driven into place to lock the bars within the U-shaped clamp, the portions 21 and 22 at the ends of the wedge and below the slits may be bent downwardly as shown, so as to form two spaced supports for the assembled structure. The length of the wedge and the extent to which these portions are bent down may determine the height at which the lowermost reinforcing bar —A— is to be held above the bottom of the concrete receiving form.

Instead of making the bar or strip 20 tapered so as to constitute a wedge, I may provide it with substantially parallel side edges and after inserting it, I may separate the opposite or free ends of the plate portions 13 and 14 so that said plate portions will stand at an angle to each other. The farther they are spread apart, the less will be the vertical distance between the ends of the slot and the edge of the bar or rod 20, and increased locking action may be secured by spreading the ends to increased distance. In this construction, it is of course evident that the locking flanges 17 and 18 may both be omitted, or if present, need not be used. The spreading action would also be facilitated by having the flanges 12 of one plate portion separate from the flange portions of the opposite plate portion. Such an arrangement would result by making the clamp from a blank cut with a transverse slot 16 as shown in Fig. 6.

The flanges 12 constitute one of the most important features of my improved clamp. Instead of cutting away the metal at the center of a blank so as to leave an opening of a width equal to the diameter of the widest or largest bar with which the clamp is to be used, I cut merely a slit or a narrow slot and bend the metal outwardly at the sides thereof. The flanges so formed may extend outwardly either at right angles to the general plane of their respective plate portions or they may be inclined at any angle in respects thereto. Preferably, in the manufacture of the clamp, they would be bent outwardly approximately to the right angled position, but in applying the clamp to the bars, the free edges of the flanges may be bent toward each other so as to engage with the sides of any width or diameter than the maximum width of the bar-receiving space between the flanges. In other words, by means of these flanges, I may reduce the width of the bar-receiving aperture so as to accommodate the clamp to bars of any desired size less than the maximum size for which the clamp is desired.

In the drawing, I have shown the clamp used in connection with three bars A, B, and C, the bar C being of materially less width than the bars A and B. When the clamp is applied to the bars, the portions of the flange 12 coming opposite to the bar C may be bent in, as clearly illustrated in Figs. 1, 2 and 3, so as to engage with the opposite sides of the bar C and hold it against lateral displacement. All of the bars may be of the same width as the bar C, in which case the flanges would be bent in along their entire lengths. In case the bars are round or of such other cross sectional form that grooves or spaces will be presented between the bars along the sides, portions of the flange may be bent inwardly into these recesses to additionally hold the bars in position. It will thus be noted that one clamp may be used to effectively lock a series of bars of lesser width than the maximum width of bar for which the clamp is designed and may effectively hold a series of bars of different widths and different cross sectional forms.

As a further important feature of my invention, I may connect the clamp directly to a shear bar or other reinforcing element, at the time the clamp is manufactured, so that a shear bar may be locked to one or more tension bars without the necessity of providing the shear bar with a portion bent to lie parallel with, and clamped to, the tension bar. To do this, I may utilize the free ends of the plate portions 13 and 14 as clamps, to receive therebetween the end of a shear bar or other reinforcing element. This shear bar is preferably deformed and the plate portions are bent while hot so as to follow the deformations of the end of the shear bar and thus firmly retain the end of the shear bar between the plate portions.

In Figs. 1 and 2, I have shown a shear bar —D— extending vertically between the upper ends of the plate portions 13 and 14 and the latter are bent to form clamping portions 24 and 25. These clamping portions may be made of such length that they will effectively hold the bar —D— and the clamp together during transportation and during the fastening of the clamp to the bars A, B, and C. It is of course evident that the clamping portions 24 and 25 may be welded directly to the shear bar although this will not ordinarily be necessary because the clamp need not be held so tightly as to resist extraordinary strains. The shear bar can only pull out of the clamp by spreading apart the clamping members, but this spreading apart will be prevented by the concrete after the latter has set. Thus, the shear bar will be held to the clamp up to the limit of the crushing strain of the concrete and this will be amply sufficient under ordinary circumstances. Plain bars which do not have deformations along their lengths cannot be effectively held by gripping between the clamping surfaces 24 and 25, but such a bar may be firmly held by upsetting, bending over, or heading the end of the bar and bending the clamp about the bar above the head or upset portion.

I may, if desired, form the clamping member integral with the end of the shear bar. In Fig. 6, I have shown a shear bar E with the end flattened to make a plate portion 10$^a$ corresponding to the plate portion of Fig. 5. It may be made of exactly the same shape as Fig. 5, although I have illustrated it of a slightly modified form as hereinabove described.

In Figs. 1 and 2, I have shown the shear bar —D— substantially at right angles to the general direction of the length of the bars —A— and —B—. This is not at all essential as it may be bent to lie at any desired angle or may even be bent over to lie substantially parallel to the bars A and B.

In Fig. 11 I have shown a shear bar —E— with a clamp formed integral therewith and serving to lock together three similar superposed reinforcing bars F, G, and H. I have also shown a bar —J— superposed upon the upper bar —H— and having a clamp connected thereto at each end and serving to not only lock the bars F, G, and H together, but to lock the bar —J— thereto at the ends of the latter. Various other arrangements of bars and clamps may be employed in the utilization of my invention.

My improved clamp may be employed not only for holding together a plurality of superposed reinforcing bars, but may also be employed for holding together a series of spaced units, each made up of a plurality of superposed bars. This may be done either by forming a plurality of bar-receiving apertures in the clamps or by connecting together separate clamps by a transverse rod. In Fig. 10, I have shown a blank $10^b$ with a plurality of slots $11^b$ corresponding to the slot 11 of Figs. 5 and 6, and having a folding line —b— at right angles thereto. The plate portions $13^b$ and $14^b$ at the opposite sides of this folding line will correspond to the plate portions 13 and 14 of the construction previously described. By bending the metal at the sides of the slots $11^b$ to form flanges and by bending the blank along the folding line, a clamp of the general form shown in Figs. 7, 8 and 9, may be produced. The slots $11^b$ may be spaced at such distances apart as it is desired to have between separate reinforcing units. With this form of blank, I preferably employ a transverse bar or rod 28 inserted along the folding line and corresponding in position to the wedge shaped bar or rod 20 heretofore described. Preferably, this rod 28 is not tapered and does not serve as a wedge, but serves to close the open end of the bar receiving apertures and permit the locking action of wedges 29 inserted in the general direction of the length of the reinforcing bars. These wedges may either be inserted between the bar 28 and the adjacent reinforcing bar, or may be inserted between the opposite end of the slot and the reinforcing bar adjacent to the latter. The clamp may be employed with the bar receiving apertures opening upwardly as shown in Fig. 7 or they may open downwardly and the bar 28 be inserted beneath the reinforcing bars.

By the use of a blank of the general form shown in Fig. 10, the desired spacing of the separate reinforcing units is insured and thus it is not necessary to exercise any particular care to get the proper spacing when the units are placed in the form. It is of course evident that I might connect together a plurality of separate clamps of the character shown in Figs. 1 to 4, inclusive, by a rod 28 and space the clamps at any desired distances apart along the rod and lock the reinforcing bars in each clamp by a wedge similar to the wedge 29. Similar results could be secured by cutting the blank 10 into sections and spacing the sections apart at the desired distances along the length of the rod 28. This rod 28 is shown as being round, but it is of course evident that it might be of any desired cross sectional form.

In the various forms of clamps hereinbefore described, the blank is folded to make the body portion of the clamp of double thickness and the wedge, rod or other retainer is inserted between the two layers at the fold and retained in position thereby. The placing of the wedge or other retainer in the fold or meeting line of the two plate portions is not essential as the retainer may be inserted at the opposite ends. In Figs. 12 to 15 I have illustrated a form of clamp which has two superposed layers or plate portions but in which the retainer is inserted through apertures at the ends opposite to the fold. In this specific construction, there are plate portions 30 and 31 adapted to be folded along the line $b$. Each plate has a slit 32 extending endwise intermediate of its side edges from the free end thereof toward the folding line $b$ and a transverse slit 33, a portion of which may extend transversely of the plate and the terminal portions may be bent toward the folding line so as to form parts 34 which may be bent outwardly to lie substantially at right angles to the planes of their respective plate portions. The parts upon opposite sides of the slits 32 may be bent outwardly along folding lines $a$ so as to leave flanges 35, corresponding to the flanges 12 of the form shown in Figs. 1 to 4 inclusive. These folded-out portions 35 may extend across the entire width of the plate portions at their extremities and these may be formed by transverse slots 36 extending inwardly from the free edges to the folding lines.

In making the clamp from the blank shown in Fig. 12, the blank would be folded along the line $b$ and along the lines $a$ and the flange portions 34 would be bent out at right angles. Thus, the terminal portions of each plate section would include two parallel parts 37 and upon the folding along the line $b$, the portions 37 at one end would overlap and lie parallel with the portions 34 of the other plate. These four portions 37 would be provided with apertures 38 through which a wedge 39, shown in dotted lines in Fig. 13, could be driven. In this construction, it will be noted that the wedge 39 passes through two thicknesses of material at each side of the bar receiving slot or aperture and that the flange portions 35 may be bent toward or from each other to vary the width of the bar receiving aperture and permit the use of the clamp with bars of various widths. It will also be noted that the bar within the bar receiving aperture and farthest from the wedge or other retainer, rests against the flat faces of the two flanges 34. These might be bent so as to lie at a slight angle to each other rather than in the same plane and this bending would permit the use of a straight bar in place of the wedge 39. For instance, a series of clamps might be connected together by a single rod corresponding to the rod 28 in Fig. 7 and by bending the flange portions 34, it might not be necessary to use any wedges corresponding to the wedges 29 shown in Fig. 7. In order to prevent the plate portions from spreading apart for a short distance down from the folding line, the blank may be provided with recesses in the edges at the ends of the folding line $b$ and portions 40 of one plate might be bent over into engagement with the opposite surface of the other plate. This is not essential, but may be found desirable in some instances. By means of these flanges 40, it is possible to make the blank shown in Fig. 12 of two pieces corresponding to the two plate portions, but divided on the line $b$.

In Figs. 16, 17 and 18, I have shown a simplified form of clamp in which only a single plate portion or thickness of material is employed. This is somewhat similar to one-half of the blank shown in Fig. 12 but differs therefrom in certain details. I omit the transverse slits 36 and extend the folding lines $a$ through the apertures 38 to the end of the blank. In Figs. 12 to 15 inclusive, I have shown the apertures formed by removing a portion of the metal. This is not essential as slots may be formed and the metal bent outwardly and stretched to leave the apertures and form a flange or collar 38 around the same as indicated in Figs. 16 to 18 inclusive. This provides additional bearing surface for the wedge or other retaining member, strengthens the plate and prevents elongation of the aperture under strain.

In practice, I preferably do not cut the metal at the ends of the flange 34 but stretch it so as to leave the ends of the flange 34 integral and continuous with the upper ends of the flanges 35. This greatly strengthens these parts. I have shown such a stretching of the metal and the continuous formation of the flanges at the ends and sides of the bar receiving aperture in the forms shown in Figs. 1 to 5 and 7 to 10, and for that reason have not shown it in Figs. 12 to 20, but may, and preferably do, employ the same in the latter forms.

In practice, I may, and preferably do, form a bead along the folding line $a$ of Figs. 16 to 18 so as to strengthen or reinforce the side members of the clamp. The flange parts 35 would extend from opposite sides of the bead. I have indicated by shading a very narrow bead along the ridge in Figs. 17 and 18.

In Figs. 19 to 21 inclusive, I have shown a construction very similar to that illustrated in Figs. 12 to 15 inclusive except that I form the plate portions from two separate blanks. Each may have a flange portion 40 adapted to be bent over into engagement with the opposite surface of the other plate portion. It will be noted that in Figs. 13 to 15 inclusive, the portions 37, through which the retainer extends, lie in parallel planes; whereas, in Fig. 21, I have shown the folding line of the flange portions 35 extending through the retainer receiving apertures. This facilitates the bending of the flange, but either construction may be adopted in either of the two forms. In Fig. 21 I have shown the flanges 35 bent toward each other so as to receive reinforcing bars of only about one-third the maximum capacity of the clamp. It is of course evident that a reinforcing bar, for instance a shear bar, may be attached to, or formed integral with, the clamps shown in Figs. 12 to 20 inclusive, the same as in the forms shown in Figs. 1 to 11 inclusive.

It will be noted that in each and all of the various forms illustrated, the body portion of the clamp has a flange which may be bent to vary the effective width of the bar receiving aperture so that bars of various different widths may be firmly clamped. It will also be noted that the flanges extend outwardly on opposite sides of the plane of the clamp so as to engage with the sides of the bars at spaced points. This is desirable although not essential. What I mean by the "plane of the clamping member" is a plane at right angles to the general direction of the bars to be clamped. In such constructions as those shown in Figs. 1 to 15 inclusive, and in Figs. 19 to 21, a portion of the clamping member at opposite sides of the bars lies substantially in this plane, but in the forms shown in Figs. 16 to 18 inclusive, the bending of the metal toward the bars on each side of the folding lines $a$ permits the engagement of the flanges with the bars without the employment of any excess material and without any material upon opposite sides of the bars lying in the plane referred to. The portion at the closed end of the bar receiving aperture does not lie in this plane in Figs. 16 to 18.

All the various forms illustrated may be made of sheet metal cut and bent to the desired form but I desire it understood that I am not limited to sheet metal, as I may in some instances use malleable steel castings with bendable flanges or other parts for varying the width of the bar receiving aperture.

Various other forms may be designed within the spirit of my invention without departing from the scope of the appended claims, although the various different forms illustrated each embodies certain advantages peculiar to itself and the various detailed features, whereby these advantages are secured, also constitute parts of my invention.

Having thus described my invention, what I claim as new and desire to secure by Letters Patent is:

1. A clamp for reinforcing bars formed of a sheet metal blank slitted longitudinally and bent to bring the opposite portions to positions substantially parallel with each other and having portions along the side edges of the slot bent laterally to form the bar-receiving aperture.

2. A clamp including two sheet metal plate portions united at one end and having a slot extending inwardly from the united ends, the portions of the metal along the side edges of the slot being bent outwardly to form lateral flanges bendable toward and from each other to vary the effective width of the slot.

3. A clamp for reinforcing bars including a sheet metal plate bent to form two plate portions substantially parallel to each other and having a slot extending inwardly from the folded edge, the metal of said plate portions along the side edges of said slots being bent outwardly to form laterally extending flanges.

4. A clamp for reinforcing bars including a sheet metal plate bent to form two plate portions substantially parallel to each other and having a slot extending inwardly from the folded edge and a member at the folded edge for retaining a series of superposed bars therein, the metal of said plate portions along the side edges of said slots being bent outwardly to form laterally extending flanges, bendable toward and from each other to vary the effective width of the slot.

5. A clamp for reinforcing bars including a sheet metal plate bent to form two plate portions substantially parallel to each other and having a slot extending inwardly from the folded edge, the metal of said plate portions along the edges of said slots being bent outwardly to form laterally extending flanges, and one of said plate portions having a flange bent around the edge of the other plate portion to prevent separation of said plate portions.

6. A clamp for reinforcing bars including a sheet metal plate bent to form two plate portions substantially parallel to each other and having a slot extending inwardly from the folded edge, a member at the folded edge for retaining a series of superposed bars in said slot, the metal of said plate portions along the edges of said slots being bent outwardly to form laterally extending flanges, and a reinforcing bar having one end portion clamped between said plate portions.

7. A clamping member formed of a sheet metal plate bent to form two plate portions substantially parallel to each other, said plate portions having registering slots extending inwardly from the folded edge, to form a bar-receiving aperture, a movable member for retaining a bar within said aperture, and the portions of said plate opposite to the bend being deformed to constitute clamping portions for receiving and retaining a separate bar therebetween.

8. A clamp for reinforcing bars including a sheet metal plate bent to form two plate portions substantially parallel to each other and having a bar receiving slot extending inwardly from the folded edge, one of said plate portions at the end opposite to the folded edge having flanges bent around the other plate portion to retain said plate portions together, and a member extending between said plate portions adjacent to the folded edge for retaining the bars within the slot.

9. The combination with a series of superposed reinforcing bars, of a clamp including a metal plate having its body portion disposed in a plane substantially at right angles to said bars and having a slot therethrough open at one end and extending lengthwise of said body portion to receive said bars, a member for closing the end of the slot and retaining said bars in position, and a flange integral with said body portion and extending along one side edge of said slot and bendable to vary the effective width of said slot.

10. The combination with a series of superposed reinforcing bars, of a clamp including a metal plate having its body portion disposed in a plane substantially at right angles to said bars and having a slot therethrough open at one end and extending lengthwise of said body portion to receive said bars, a member for closing the end of the slot and retaining said bars in position, and flanges integral with said body portion and extending along the opposite side edges of said slot and bendable toward and from each other to vary the effective width of said slot.

11. A clamp adapted for use in securing together a series of superposed, substantially parallel, reinforcing bars, said clamp including a sheet metal plate, slitted lengthwise and having the portions of the metal along opposite sides of the slit bent outwardly to form a slot and adapted to receive said bars, the extent of said bending being varied in accordance with the width of said bars and a removable member closing one end of said slot and holding said bars in position.

12. The combination with a series of superposed reinforcing bars, of a clamp including a metal plate having a slot open at one end and extending lengthwise of said body portion to receive said bars, a member for closing the end of the slot and retaining said bars in position, and a flange integral with said body portion and extending along one side edge of said slot and bendable to vary the effective width of said slot.

Signed at New York, in the county of New York and State of New York, this 21st day of July, A. D. 1915.

CHARLES F. VARNEY.